(12) United States Patent
Lu et al.

(10) Patent No.: US 11,243,909 B2
(45) Date of Patent: Feb. 8, 2022

(54) JOURNALING OVERHEAD REDUCTION WITH REMAPPING INTERFACE

(71) Applicant: Alibaba Group Holding Limited, Grand Cayman (KY)

(72) Inventors: Qingda Lu, Bellevue, WA (US); Yikang Xu, Redmond, WA (US); Qinghua Ye, Sammamish, WA (US); Jiesheng Wu, Redmond, WA (US); Liping Bao, Sammamish, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 281 days.

(21) Appl. No.: 16/176,770

(22) Filed: Oct. 31, 2018

(65) Prior Publication Data

US 2020/0134041 A1 Apr. 30, 2020

(51) Int. Cl.
*G06F 16/13* (2019.01)
*G06F 12/06* (2006.01)
*G06F 16/11* (2019.01)
*G06F 16/18* (2019.01)

(52) U.S. Cl.
CPC .............. *G06F 16/13* (2019.01); *G06F 12/06* (2013.01); *G06F 16/122* (2019.01); *G06F 16/1815* (2019.01)

(58) Field of Classification Search
CPC ...... G06F 3/0665; G06F 16/13; G06F 16/137; G06F 16/183; G06F 16/188; G06F 16/9014; G06F 16/9017; G06F 16/2365; G06F 16/1734; G06F 16/1815
See application file for complete search history.

(56) References Cited

U.S. PATENT DOCUMENTS

| 2006/0218205 | A1 | 9/2006 | Shimizu et al. |
| 2009/0150599 | A1* | 6/2009 | Bennett ............... G06F 12/0246 711/103 |
| 2010/0161928 | A1* | 6/2010 | Sela .................... G06F 21/6218 711/163 |

(Continued)

FOREIGN PATENT DOCUMENTS

WO WO2016183542 A1 11/2016

OTHER PUBLICATIONS

PCT Preliminary Report on Patentability dated Feb. 6, 2020 for PCT application No. PCT/CN2019/114258, 5 pages.

(Continued)

*Primary Examiner* — Apu M Mofiz
*Assistant Examiner* — Cindy Nguyen
(74) *Attorney, Agent, or Firm* — Lee & Hayes, P.C.

(57) ABSTRACT

Methods and systems are provided for improving a journaling file system by reducing journaling overhead utilizing a remapping interface to log-structured cloud block devices such that blocks in a journaling transaction are atomically mapped to their final disk locations with minimum overhead. With log-structured cloud block devices, all blocks may be stored in logfiles and indexed for access. By modifying the index of the destination block to point to the corresponding journal block, the additional write may be avoided, and a journal block may effectively be remapped from its original LBA to its destination LBA without any actual data movement, thereby reducing the file system journaling overhead.

17 Claims, 9 Drawing Sheets

(56) References Cited

U.S. PATENT DOCUMENTS

2013/0227236 A1\* 8/2013 Flynn .................. G06F 3/061
                                                        711/165
2016/0357639 A1   12/2016 Winokur
2018/0113631 A1\* 4/2018 Zhang .................. G06F 3/064

OTHER PUBLICATIONS

PCT Search Report dated Feb. 6, 2020 for PCT application No. PCT/CN2019/114258, 4 pages.
PCT Written Opinion dated Feb. 6, 2020 for PCT application No. PCT/CN2019/114258, 4 pages.

\* cited by examiner

JOURNALING OVERHEAD REDUCTION WITH REMAPPING INTERFACE

BACKGROUND

File system or filesystem is used to control how data is stored and retrieved in computing. By separating the data into pieces and giving each piece a name, the information is easily isolated and identified. Each group of data is called a "file," and the structure and logic rules used to manage the groups of information and their names are called a "file system." A journaling file system is a file system that keeps track of changes not yet committed to the file system's main part by recording the intentions of such changes in a data structure known as a "journal." In the event of a system crash or power failure, such a file system can be brought back online quickly based on the journal with a low likelihood of becoming corrupted.

There are two main types of journals: a physical journal and a logical journal. A physical journal logs an advance copy of every block that will later be written to the main file system. If there is a crash while the main file system is being written to, the write can simply be replayed to completion when the file system is next mounted. If there is a crash when the write is being logged to the journal, the partial write will have a missing or mismatched checksum and can be ignored at next mount. Both file data and metadata are logged by a file system with a physical journal. A logical journal stores only changes to file metadata in the journal, and trades fault tolerance for substantially better write performance. A file system with a logical journal still recovers quickly after a crash, but may allow unjournaled file data and journaled metadata to fall out of sync with each other, causing data corruption.

However, file system journaling is known to cause performance issues due to the need to write the journal before final changes are made to a storage medium, such as a disk, and is sometimes disabled for performance reasons despite the importance of file system consistency. Furthermore, physical journaling is rarely used in practice because it amplifies every write by a factor of two, i.e., a file system first writes data to the journal and later the same data block is written to the final disk location. In the event of a system crash, journal replay time can also be long, and after the reboot, the file system may be unavailable for a considerably long time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
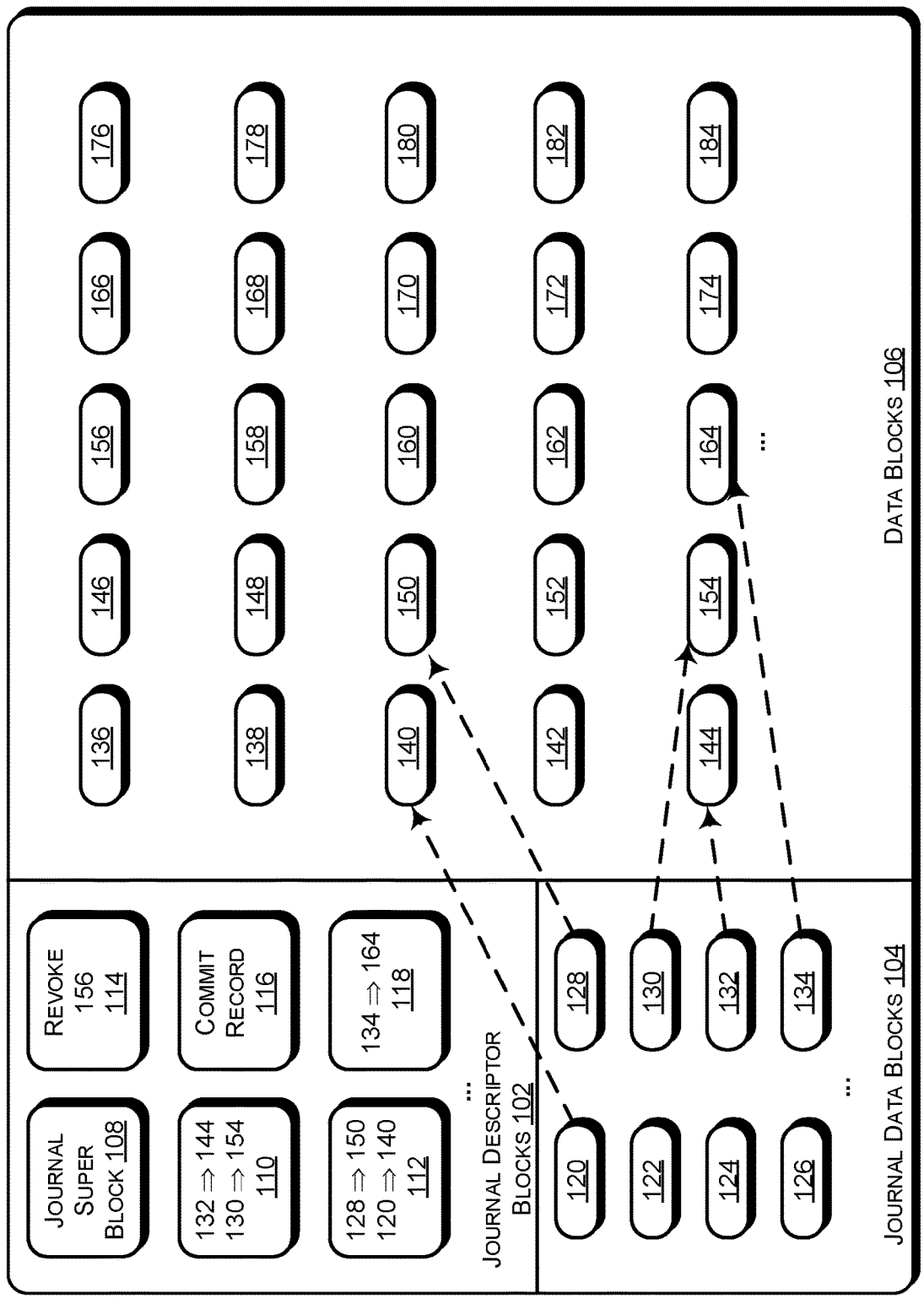
FIG. 1 illustrates an example logical layout of a journaling file system on a block device.

Methods and systems discussed herein are directed to improving a journaling file system, and more specifically to reducing journaling overhead by utilizing a remapping interface to cloud block devices such that blocks in a journaling transaction are atomically mapped to their final disk locations with minimum overhead.

A file system update operation, such as write, truncate, create, unlink, and the like, may span over multiple sectors and several blocks at different locations of an underlying disk. For example, when a file is created, the file system may internally allocate and initialize a new index node (inode), which is a data structure on a filesystem that stores or contains information about the file, or folder, such as its size, owner, device node, socket, pipe, etc., except data content and file name. The file system may decrease the count of free inodes and add a new entry to new file's parent directory. If a failure, such as a system crash or power outage, happens before all the blocks are written, an inconsistent state of the file system may be introduced. To detect and fix such inconsistencies, the entire file system may need to be scanned, which may take a significant amount of time, often hours in practice.

To prevent introducing such inconsistencies, journaling may be utilized to provide atomicity to update operations.

A file system journal may keep track of changes not yet committed to their final destinations by recording the intentions of such changes. The file system journal may first record all the updates it has performed in the journal. Only after all the updates of an atomic operation have been completed and recorded in the journal, which may be referred to as journal commit, they are written to their final locations on a block device, which may be referred to as checkpointing, where the block device may be a peripheral device that transfers a group of bytes, block, sector, etc. of data at a time, such as a hard disk. In the event of a system crash or power failure, a file system journal may be recovered by replaying committed records in its journal.

The journal may reside on a block device other than the main file system device, for example, the journal may reside of a solid-state drive (SSD) disk for a file system backed by a mechanical hard drive. The file system may normally only perform journaling of metadata, during which the file data is simply written to their final disk locations instead of the journal. The file system may also journal the file data to provide strong consistency, by presenting the data to the journal together with corresponding metadata, which may be referred to as physical journaling. In the case of the ext4, a journaling file system for Linux, "mounting option data journal" may be used to specify that all data should be journaled with metadata for strong consistency. However, the physical journaling is rarely used as it amplifies all the data involved in each write instead of just the metadata.

File system journaling may consist of several components: transaction committing, transaction checkpointing and file system recovery. The flows of file system journaling are describe below following Linux journaling block device (JBD). A JBD is a generic block device journaling layer in the Linux kernel, which provides a filesystem-independent interface for filesystem journaling. The Ext4 uses a fork of a JBD named a JBD2.

A handle may represent a single atomic update, and the entire set of changes and/or writes within a single handle may be performed atomically. Because it may be inefficient to flush every handle separately to the journal, a transaction may be introduced, which includes a set of handles. An operating system (OS) block journaling layer, e.g. JBD, may ensure that each transaction is atomic.

FIG. 1 illustrates an example logical layout of a journaling file system on a block device 100.

The block device may be partitioned into three groups of blocks, journal descriptor blocks 102, journal data blocks 104, and data blocks 106. The journal may have its own metadata consisting of a journal superblock 108 and journal descriptor blocks, of which five, 110, 112, 114, 116, and 118, are shown, in the journal descriptor blocks 102. Each journal descriptor block may store block mappings from journal disk locations to final disk locations. A special journal descriptor block 114 may store revoke records that keep track of the freed blocks during the transaction, which may prevent freed blocks that are later updated from being overwritten in a journal replay. Another special journal descriptor block 116 may store a transaction commit record that represents a transaction is committed. The journal data blocks 104 may include a plurality of blocks, of which eight blocks, 120 to 134 are shown. The data blocks 106 may include a plurality of blocks, of which 25 blocks, 136 to 184 are shown. The journal descriptor blocks 110, 112, and 114 are journal descriptor blocks of a committed transaction, and a complete transaction log may be described by the journal descriptor blocks 110, 112, 114, and 116 with the journal data blocks 120, 128, 130, and 132, in which the descriptor block 114 may have a revoke record that frees the block 156. The journal descriptor block 116 may have a commit record indicating the committed state of this transaction. The block 118 is the first journal descriptor block of the next transaction.

A thread may be associated with each journal and may commit the running transaction after a specific interval. The transaction committing process may consist of multiple phases as described below.

The committing transaction may be locked and may stop accepting new handles. For the logical journaling, data buffers may then be flushed to their final locations. For the physical journaling, metadata blocks and data blocks may be written from memory to their journal locations, and the journal descriptor blocks may be filled with mappings that describe the journal location to final disk location mappings and then be flushed to the journal. The file system may then wait for inputs/outputs (IOs) in the previous phase to finish and remove the buffers from in-memory lists. A special descriptor block containing a commit record, such as the descriptor block 116, may be written and flushed to the end of the journal to indicate that the transaction log is complete. If the commit record were absent, the whole transaction would be considered incomplete and the transaction log would not be replayed in the file system recovery. The transaction may then be marked as finished and be added to the list of transactions to be checkpointed as described below.

The checkpointing process may flush the metadata and/or data buffers of a transaction to their actual locations on the disk. The transaction may then be removed from the journal. Because the journal is usually of a fixed small size, this process may be required to reclaim journal space and make it available for future transactions. During non-faulty scenarios, this step may introduce redundant writes after file system update operations, which may incur considerable disk overhead.

When the file system comes up after a crash, it may check whether the file system journal is empty. A non-empty journal may indicate that the last unmount was not successful or never occurred. At this point, the file system may attempt a recovery. The recovery process may normally consist of three phases.

In a scan phase, the end of the log may be found, indicating to the recovery process which transactions need to be replayed. In a revoke phase, a list of revoked blocks may be prepared from the log, and a table of all revoked blocks in the committed transactions may be prepared. The table may then be consulted to determine whether a particular block should be written to a disk through a replay. In a replay phase, unrevoked blocks may be replayed to guarantee the consistency of the file system. However, the replay process may be slow if many transactions have not been checkpointed in time before the system failure, and may result in a long unresponsive time after the system failure.

Most file systems may be based on block devices, such as hard disks, that are designed to transfer a group of bytes, such as block, sector, etc., of data at a time. Because of available high-speed networking technologies, virtual machine (VM) instances may use remote block storage in a cloud environment instead of relying on physically attached block devices. By disaggregating computing and storage, such a design may provide fully managed virtual storage devices and introduce benefits such as, operational cost reduction, capacity and/or bandwidth scaling, data deduplication, and high availability, and the like. Such virtualized block storage services may be relied on to provide OS boot disks and VM-private disks. However, compared to a local block device, such as a hard disk, journaling overhead on a cloud block device may be more critical due to its distributed nature.

For example, writes from a VM to remote cloud block devices may travel over a communication network, such as the Internet and a wired or wireless network, which may incur higher latencies than the latencies with local block devices. Additionally, data may be replicated several times by cloud bock devices for high availability. While journaling for local block devices may double the write volume at the host side, data volume may increase by a factor of six for the cloud block devices if each block were replicated three times. Thus, the cloud block devices may put a high burden on the shared network infrastructure and may create a network bottleneck.

As discussed above, the file system journaling overhead may be mainly due to the extra writes when a transaction is checkpointed during normal operations, or the journal replay during the file system recovery.

Figure 2:
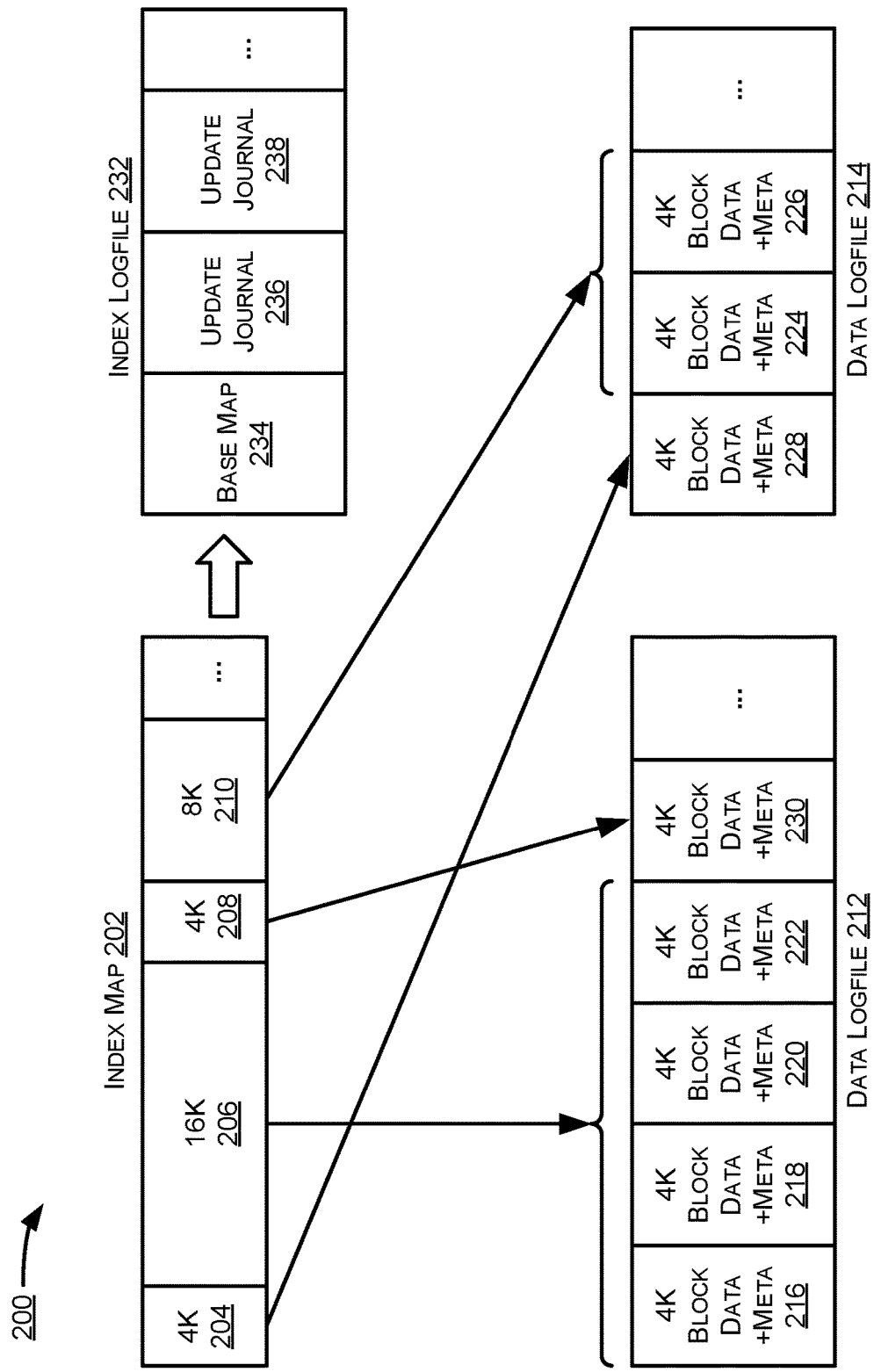
FIG. 2 illustrates an example data layout of a log structured block device.

FIG. 2 illustrates an example data layout 200 of a log-structured block device.

A logical block address (LBA) mapping, or an index map, 202, may maintain information, such as durable data log file ID and logfile offset, for mapping from the LBA to the physical location. The LBA is a common scheme used for specifying the location of blocks of data stored on block storage devices, and is usually a simple linear addressing scheme such that blocks are located by an integer index, with the first block being LBA 0, the second LBA 1, and so on. The index map 202, an in-memory index structure, may describe LBA-to-physical location mappings of a plurality of data blocks, of which four data blocks, 204, 206, 208, and 210 are shown in this example, as mapped to two data logfiles 212 and 214. All write requests may append new data to the end of some data logfile, and old data may not be overwritten at the time of completing the write requests. The 16K data block 206 consisting of four consecutive LBAs may be written to the data logfile 212 as four 4K blocks 216, 218, 220, and 222, containing sufficient per-data block metadata to describe the 16K block 206. Such a mapping may be described by a single record in the index map 202. The metadata may include an LBA, a request sequence number, a snapshot version number, cyclic redundancy checks (CRCs), encryption metadata, such as Initialization Vector (IV) used to provide randomization with some encryption schemes, and the like. Similarly, the 8K data block 210 may be written to the data logfile 214 as two 4K blocks 224 and 226 containing sufficient per-data block metadata to describe the 8K block 210. The 4K data block 204 may be written to the data logfile 214 as a 4K block 228 and the 4K data block 208 may be written to the data logfile 212 as a 4K block 230. The index map 202 may periodically checkpointed into a separate index logfile 232. The index map 202 may be backed by persistent logfiles, such as being written to an index logfile 232 including a base map 234 and a plurality of update journals, of which two, 236 and 238, are shown in this example. To read any blocks, the index map 202 may be consulted first to determine the current location of the requested blocks.

With log-structured block devices, all blocks may be stored in logfiles and indexed for access. By modifying the index of the destination block to point to the corresponding journal block, the additional write may be avoided. A journal block may effectively be remapped from its original LBA to its destination LBA without any actual data movement, thereby reducing the file system journaling overhead.

Figure 3:
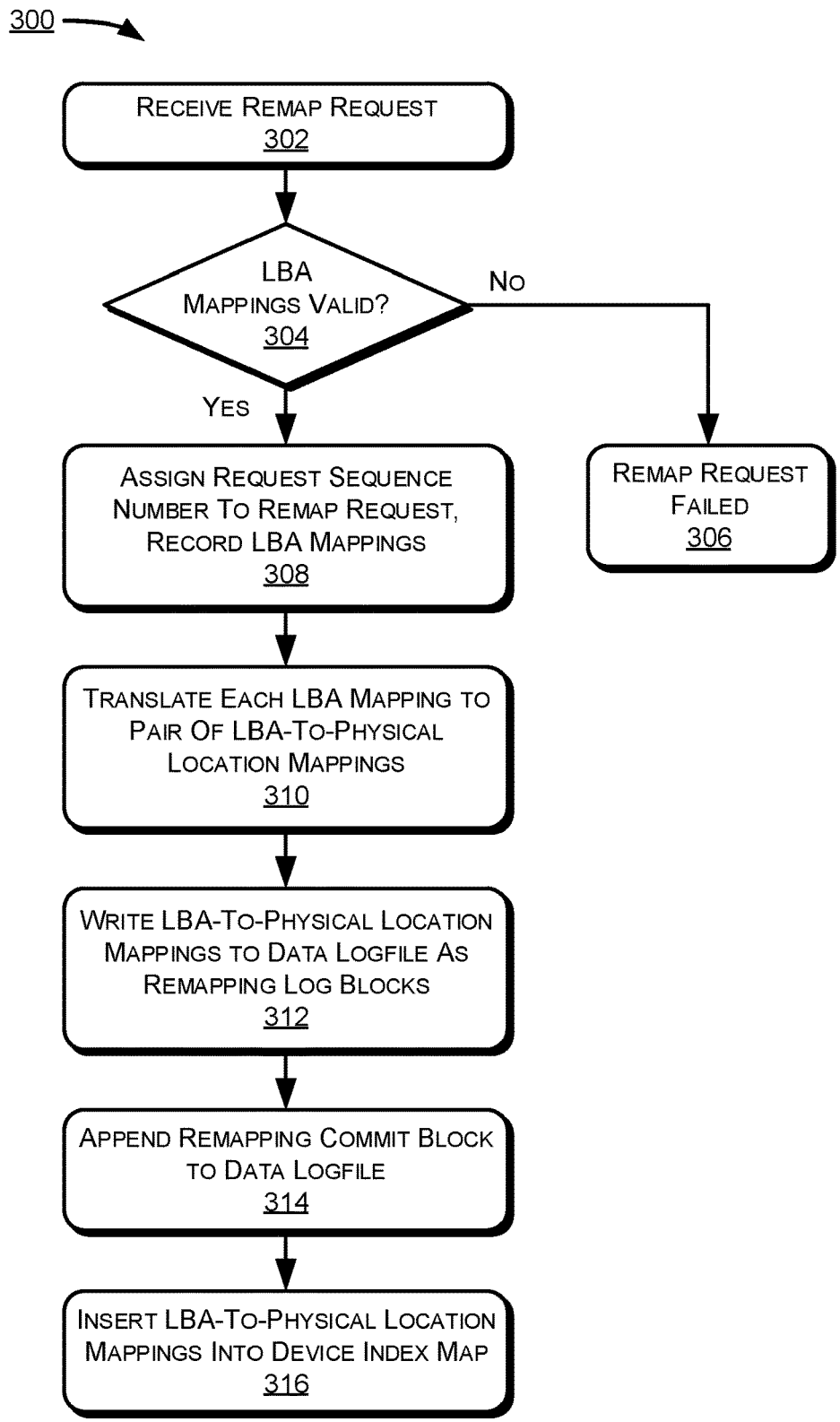
FIG. 3 illustrates an example process for file system journaling for a cloud block service system having a log-structured block device.

FIG. 3 illustrates an example process 300 for file system journaling for a cloud block service system having log-structured block devices. The cloud block service system may utilize virtual block devices as the log-structured block devices that are backed by a device index map.

At block 302, the cloud block service system may receive a remap request from a client, and determine whether logical block address (LBA) mappings of the virtual block device in the remap request are valid at block 304. If the LBA mappings are determined to be invalid at block 304, the remap request may be failed at block 306. The process may loop back to block 304 to retry the same LBA mappings for validity. Upon determining that the LBA mappings are valid at block 304, the cloud block service system may assign a request sequence number to the remap request and record the LBA mappings at block 308. The cloud block service system may then translate each LBA mapping to a corresponding pair of LBA-to-physical location mappings based on the device index map of the virtual block device at block 310, and write the corresponding pairs of LBA-to-physical location mappings to a data logfile as corresponding remapping log blocks at block 312. Metadata of each remapping log block may include a tag indicating the corresponding block is a part of the remap request.

Each LBA mapping may comprise a corresponding first LBA value and a corresponding second LBA value, for example (LBA1, LBA2), and may be translated into two LBA-to-physical location mapping. A first LBA-to-physical location mapping may comprise the corresponding second LBA value and a first physical location determined in the device index map based on the corresponding first LBA value, for example, (LBA2, location1), where location1 is the physical location found in the device index map using LBA1 as the key in the form of {durable data logfile Id, file offset}. A second LBA-to-physical location mapping may comprise the corresponding first LBA value and a null location in the device index map, for example, (LBA1, null location), where the null location indicates that the block at the null location is not in use, and any read of the block may return 0s.

The cloud block service system may append a remapping commit block to the data logfile to indicate that the remap request is committed at block 314, and insert the corresponding pairs of LBA-to-physical location mappings into the device index map at block 316. Thus, by modifying the index of the destination block to point to the corresponding journal block, the additional write may be avoided, and a journal block may effectively be remapped from its original LBA to its destination LBA without any actual data movement, thereby reducing the file system journaling overhead.

Figure 4:
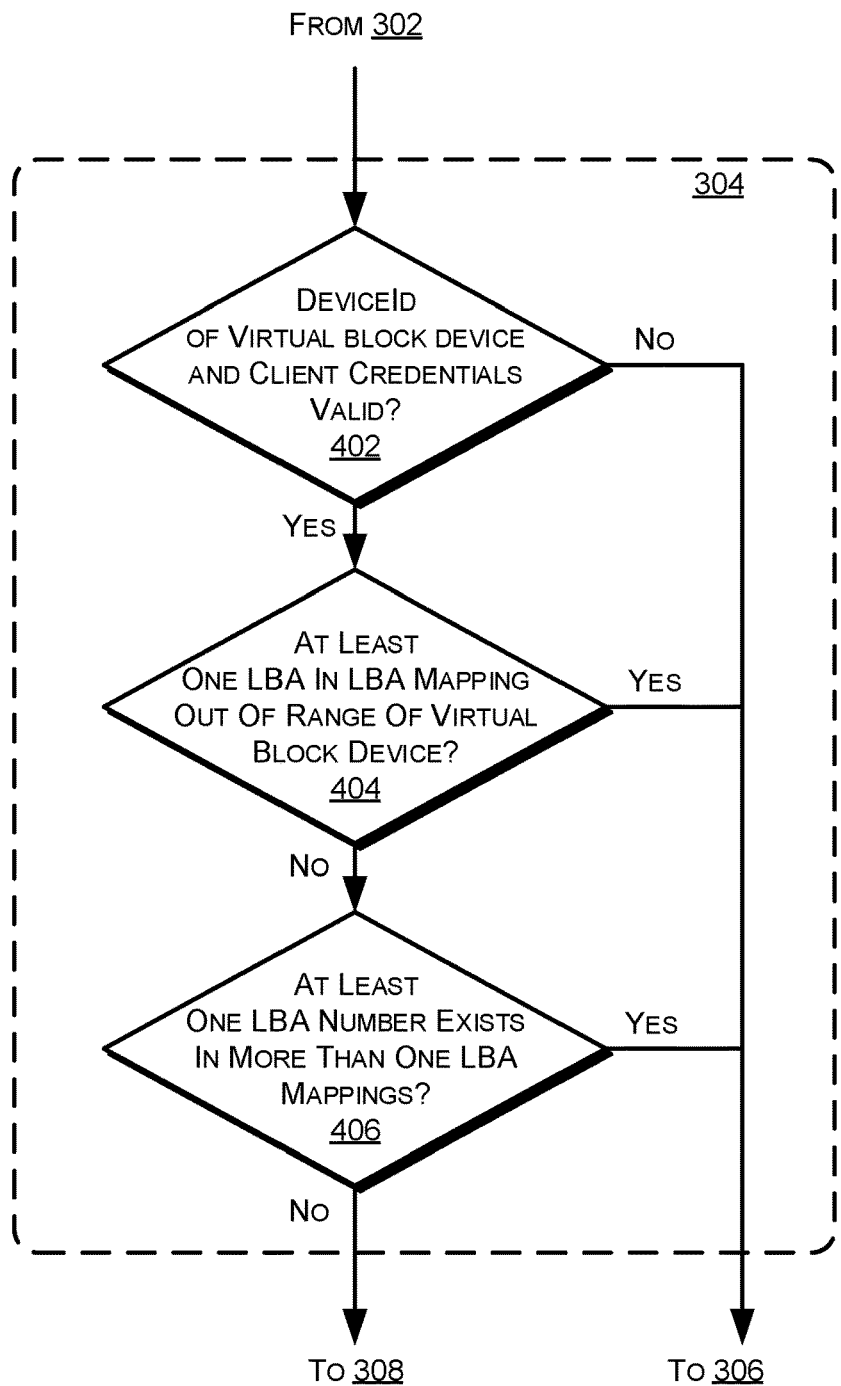
FIG. 4 illustrates an example detail of one of the blocks of FIG. 3.

FIG. 4 illustrates an example detail of block 304 of FIG. 3.

In response to receiving the remap request from the client at block 302, the cloud block service system may determine whether a device identification (DeviceId) of the virtual block device and credentials of the client in the remap request are valid at block 402. If the Device Id and the credentials are determined not to be valid, the remap request may be failed at block 306. Upon determining that the DeviceId and the credentials are valid at block 402, the cloud block service system may determine whether the LBA mappings in the remap request are valid. At block 404, the cloud block service system may determine that the LBA mappings in the remap request are not valid if at least one LBA in the LBA mappings is out of range of the virtual block device, and the remap request may be failed at block 306. If no LBA in the LBA mappings is out of range of the virtual block device, then the cloud block service system may, at block 406, determine that the LBA mappings in the remap request are not valid if at least one LBA number exists in more than one LBA mappings, and the remap request may be failed at block 306. If no LBA number exists in more than one LBA mappings, then the LBA mappings are determined to be valid, and the process may proceed to block 308.

Figure 5:
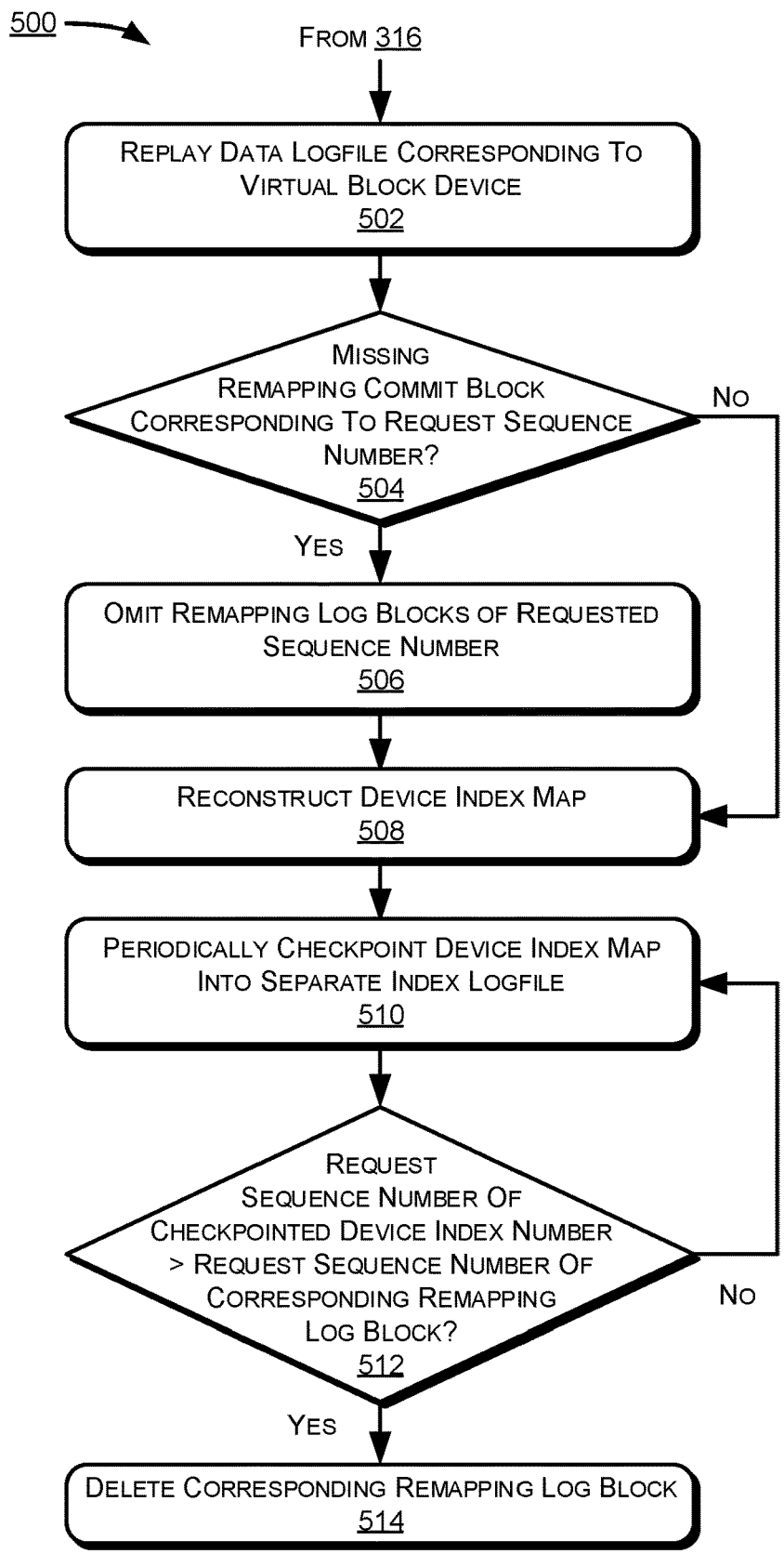
FIG. 5 illustrates an example process of the cloud block service system for reconstructing the device index map.

FIG. 5 illustrates an example process 500 the cloud block service system for reconstructing the device index map.

In the event of a system failure, the process at block 316 of inserting the corresponding pairs of LBA-to-physical location mappings into the device index map may not be completed or the device index may be corrupted. At block 502, which may follow block 316, the cloud block service system may replay the data logfile corresponding to the virtual block device, and may determine whether a remapping commit block corresponding to the request sequence number is missing at block 504. If the remapping commit block is determined to be missing at block 504, the cloud block service system may omit remapping the log blocks of the request sequence number at block 506, and reconstruct the device index map at block 508. If the remapping commit block is determined not to be missing at block 504, the process may proceed to block 508.

The cloud block service system may periodically checkpoint the device index map into a separate index logfile at block 510, and may determine whether a latest request sequence number of a checkpointed device index map has surpassed a request sequence number of a corresponding remapping log block in the data logfile at block 512. Upon determining that the latest request sequence number of the checkpointed index map has surpassed the request sequence number of the corresponding remapping log block in the data logfile, the cloud block service system may delete the corresponding remapping log block, which may also be referred to as garbage collection, at block 514. If the latest request sequence number of the checkpointed index map has been determined not to surpass the request sequence number of the corresponding remapping log block at block 512, the process may loop back to block 510.

Figure 6:
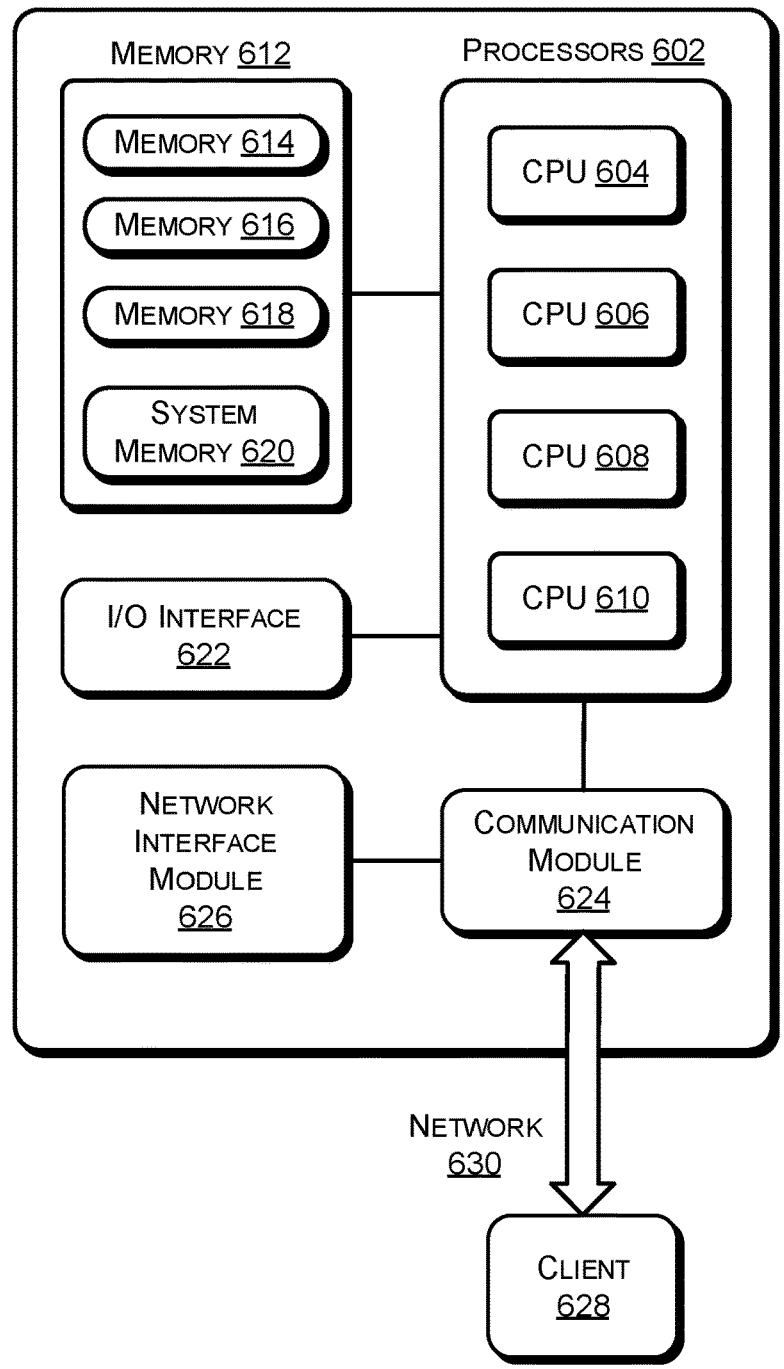
FIG. 6 illustrates an example block diagram of the cloud block service system.

FIG. 6 illustrates an example block diagram 600 of the cloud block service system.

The techniques and mechanisms described herein may be implemented by multiple instances of the system 600 as well as by any other computing device, system, and/or environment. The system 600 shown in FIG. 6 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The cloud block service system 600 may comprise a plurality of processors 602 (four processors 604, 606, 608, and 610 are shown in this example as central processing units (CPUs)) that are communicatively coupled to each other. The processors 602 may or may not be co-located, for example, in a distributed network or system such as a cloud computing system. Memory 612 may comprise a plurality of memory modules (three memory modules 614, 616, 618, and a system memory module 620 are shown in this example) coupled to each other and to the processors 602. A virtual block device and a device index map may be formed within the memory 612 distributed over one or more of memory modules 614, 616, and 618. The processors 602 execute computer executable instructions stored in the system memory module 620 to perform a variety of functions as described below with reference to FIGS. 1-5. The processors 602 may include a central processing CPUs, graphics processing units (GPUs), both CPUs and GPUs, or other processing units or components known in the art. Additionally, each of the processors 604, 606, 608, and 610 may possess its own local memory, which also may store program modules, program data, and/or one or more operating systems.

Depending on the exact configuration and type of the cloud block service system 600, the memory 612 may be volatile, such as RAM, non-volatile, such as ROM, flash memory, miniature hard drive, memory card, and the like, or some combination thereof. The memory 612 may store computer-executable instructions that are executable by the processors 602.

The cloud block service system 600 may additionally include an input/output (I/O) interface 622 for receiving data, such as network data packets, and for outputting processed data. The cloud block service system 600 may also include a communication module 624 and a network interface module 626 allowing the cloud block service system 600 to communicate with other device(s) or system(s), such as a client 628, over a network 630. The network 630 may include the Internet, wired media such as a wired network or direct-wired connections, and wireless media such as acoustic, radio frequency (RF), infrared, and other wireless media.

The cloud block service system 600 may receive a remap request from the client 628 via the network 630, and the processors 602 may determine whether LBA mappings of the virtual block device in the remap request are valid. If the LBA mappings are determined to be invalid, the remap request may be failed and the same LBA mappings may be retried for validity. Upon determining that the LBA mappings are valid, the processors 602 may assign a request sequence number to the remap request and record the LBA mappings. The processors 602 may then translate each LBA mapping to a corresponding pair of LBA-to-physical location mappings based on the device index map of the virtual block device, and write the corresponding pairs of LBA-to-physical location mappings to a data logfile as corresponding remapping log blocks. Metadata of each remapping log block may include a tag indicating the corresponding block is a part of the remap request.

Each LBA mapping may comprise a corresponding first LBA value and a corresponding second LBA value, for example (LBA1, LBA2), and may be translated into two LBA-to-physical location mapping. A first LBA-to-physical location mapping may comprise the corresponding second LBA value and a first physical location determined in the device index map based on the corresponding first LBA value, for example, (LBA2, location1), where location1 is the physical location found in the device index map using LBA1 as the key in the form of {durable data logfile Id, file offset}. A second LBA-to-physical location mapping may comprise the corresponding first LBA value and a null location in the device index map, for example, (LBA1, null location), where the null location indicates that the block at the null location is not in use, and any read of the block may return 0s.

The processors 602 may append a remapping commit block to the data logfile to indicate that the remap request is committed, and insert the corresponding pairs of LBA-to-physical location mappings into the device index map. Thus, by modifying the index of the destination block to point to the corresponding journal block, the additional write may be avoided, and a journal block may effectively be remapped from its original LBA to its destination LBA without any actual data movement, thereby reducing the file system journaling overhead.

In response to receiving the remap request from the client 628, the processors 602 may determine whether a device identification (DeviceId) of the virtual block device and credentials of the client 628 in the remap request are valid. If the Device Id and the credentials are determined not to be valid, the remap request may be failed. Upon determining that the DeviceId and the credentials are valid, the processors 602 may determine whether the LBA mappings in the remap request are valid. The processors 602 may determine that the LBA mappings in the remap request are not valid if at least one LBA in the LBA mappings is out of range of the virtual block device, and the remap request may be failed. If no LBA in the LBA mappings is out of range of the virtual block device, then the processors 602 may determine that the LBA mappings in the remap request are not valid if at least one LBA number exists in more than one LBA mappings, and the remap request may be failed. If no LBA number exists in more than one LBA mappings, then the LBA mappings are determined to be valid.

In the event of a system failure, the process of inserting the corresponding pairs of LBA-to-physical location mappings into the device index map may not be completed or the device index map may be corrupted. The processors 602 may then replay the data logfile corresponding to the virtual block device, and may determine whether a remapping commit block corresponding to the request sequence number is missing. If the remapping commit block is determined to be missing, the processors 602 may omit remapping the log blocks of the request sequence number, and reconstruct the device index map. If the remapping commit block is determined not to be missing, the processors 602 may reconstruct the device index map.

The processors 602 may periodically checkpoint the device index map into a separate index logfile, and may determine whether a latest request sequence number of a checkpointed device index map has surpassed a request sequence number of a corresponding remapping log block in the data logfile. Upon determining that the latest request sequence number of the checkpointed index map has surpassed the request sequence number of the corresponding remapping log block in the data logfile, the processors 602 may delete the corresponding remapping log block, which may also be referred as garbage collecting. If the latest request sequence number of the checkpointed index map has been determined not to surpass the request sequence number of the corresponding remapping log.

To reduce the journaling overhead, the block device virtualization stack and the operating system (OS) block journaling may be modified as illustrated below to utilize the above remapping interface.

A paravirtualized block device driver, for example, a virtio block device driver in a guest OS that provides block device virtualization within a Kernel-based Virtual Machine (KVM), may be introduced. The paravirtualized block device driver may include knowledge to run in a virtual environment and to cooperate with a virtual machine monitor, such as a hypervisor. The paravirtualized block device driver may provide a new device-specific IOCTL command REMAP_CMD that allows an OS code to remap a range of LBAs. Upon receiving a remap IOCTL, the paravirtualized block device driver may pass the command down to the virtual device on the hypervisor. For example, with virtio, a new request type VIRTO_BLK_T_REMAP may be added and LBA mappings may be passed in a data field of virtio_blk_req.

A journaling block device module, such as a JBD in Linux, may not require any change in the transaction committing code, which may have the most complex logic in block journaling code. At transaction checkpointing, instead of writing a large amount of individual data blocks within a transaction to their final locations, an IOCTL may be issued with a command REMAP_CMD and a list of LBA mappings to the paravirtualized block device driver. After a synchronous IOCTL call is completed by the paravirtualized block device driver, remapped journal blocks may be safely reused. At a system recovery, a journal replay may be similar to the above steps at the transaction checkpointing.

Upon receiving a remap request from the paravirtualized block device driver in the guest OS, a remap remote procedure call (RPC) may be initiated to the cloud block storage service by the hypervisor. Upon receiving a remap response from the cloud block storage service, the hypervisor may send an interrupt to the guest OS to indicate that further handling is needed. A polling mode, instead of the interrupt, may also be utilized to indicate that the remap request has succeeded or failed. The journaling block device thread may then be awakened from a blocked state to handle the completion of the original remap IOCTL.

Figure 7:
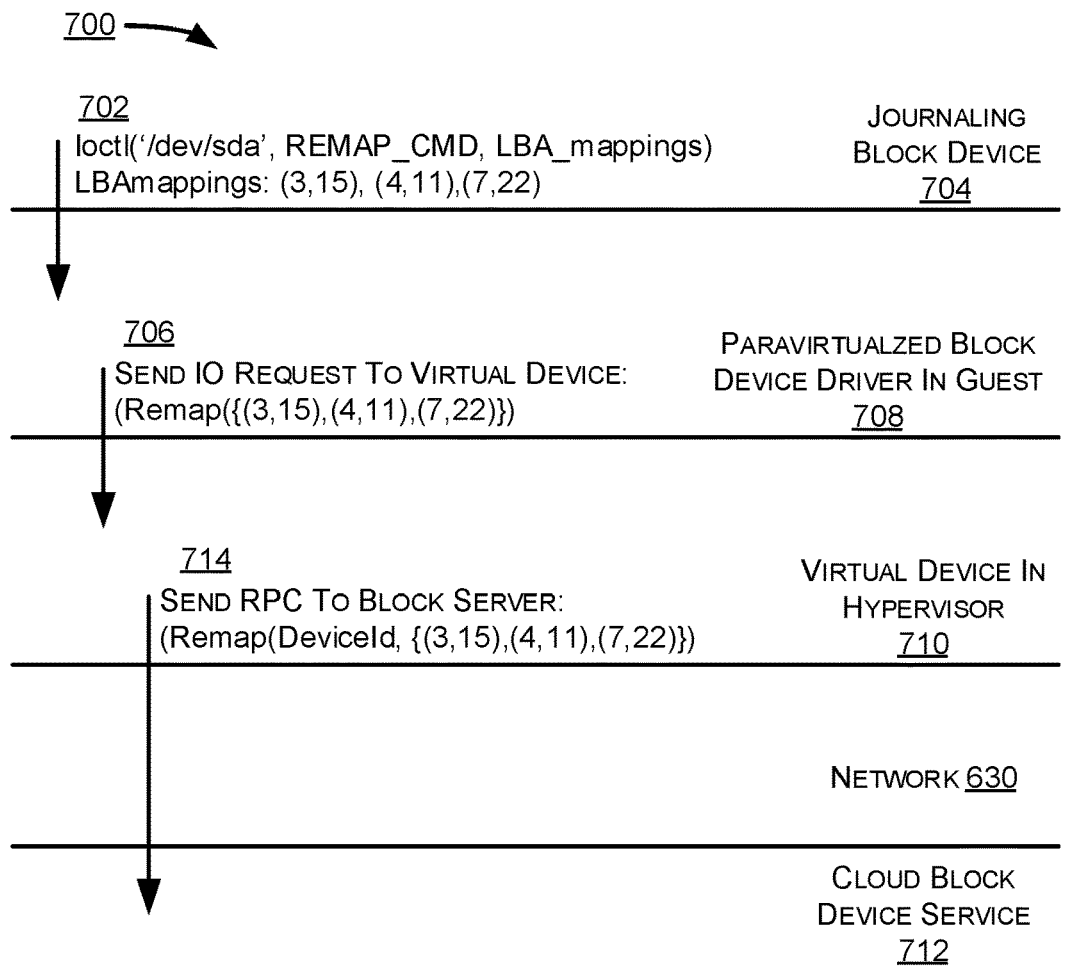
FIG. 7 illustrates a first example remap request initiation flow.
Figure 7:
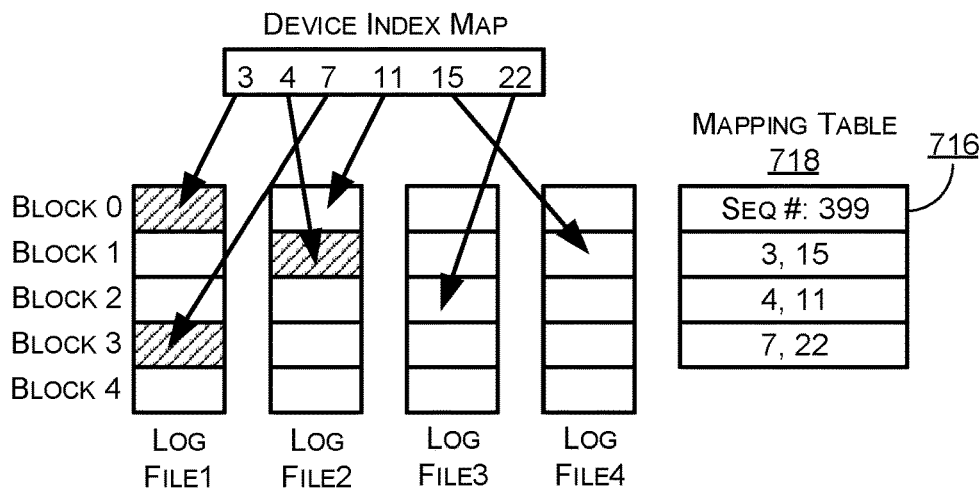

FIG. 7 illustrates a first example remap request initiation flow 700.

A remap request is initiated as IOCTL 702 by the journaling block device 704 in the OS at transaction committing or file system recovery. The remap request is then translated as a special IO request 706 by a paravirtualized block device driver (e.g. virtio) 708, and sent to the corresponding virtual device 710 in the hypervisor. The remap request is then sent via the network 630 to the cloud block device service 712 via RPC 714. After checking the validity of the request, the server assigns a request sequence number 716, and stores the LBA mappings in memory, i.e., a mapping table 718.

Figure 8:
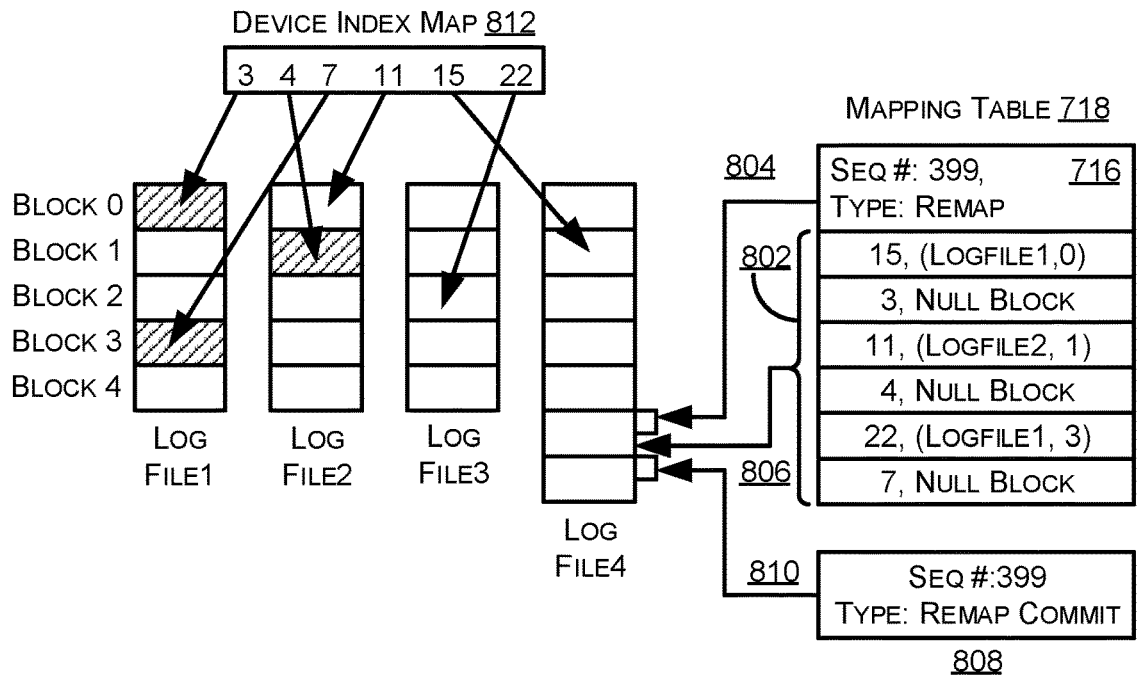
FIG. 8 illustrates a first example remap request initiation flow.

FIG. 8 illustrates a second example remap request initiation flow 800.

Before the remap request is completed, the cloud block device service 712 first translates the LBA mappings to LBA-to-physical location mappings 802. The cloud block device service 712 then writes these new mappings 802 as special remapping log blocks in a data log file and records the special remap block type and request sequence number in the block headers as shown by lines 804 and 806. After all remapping log blocks are successfully written, a remapping commit block 808 is written, as shown by line 810, to indicate the request is committed. The new LBA-to-physical location mappings are then inserted to the in-memory device index map 812.

Figure 9:
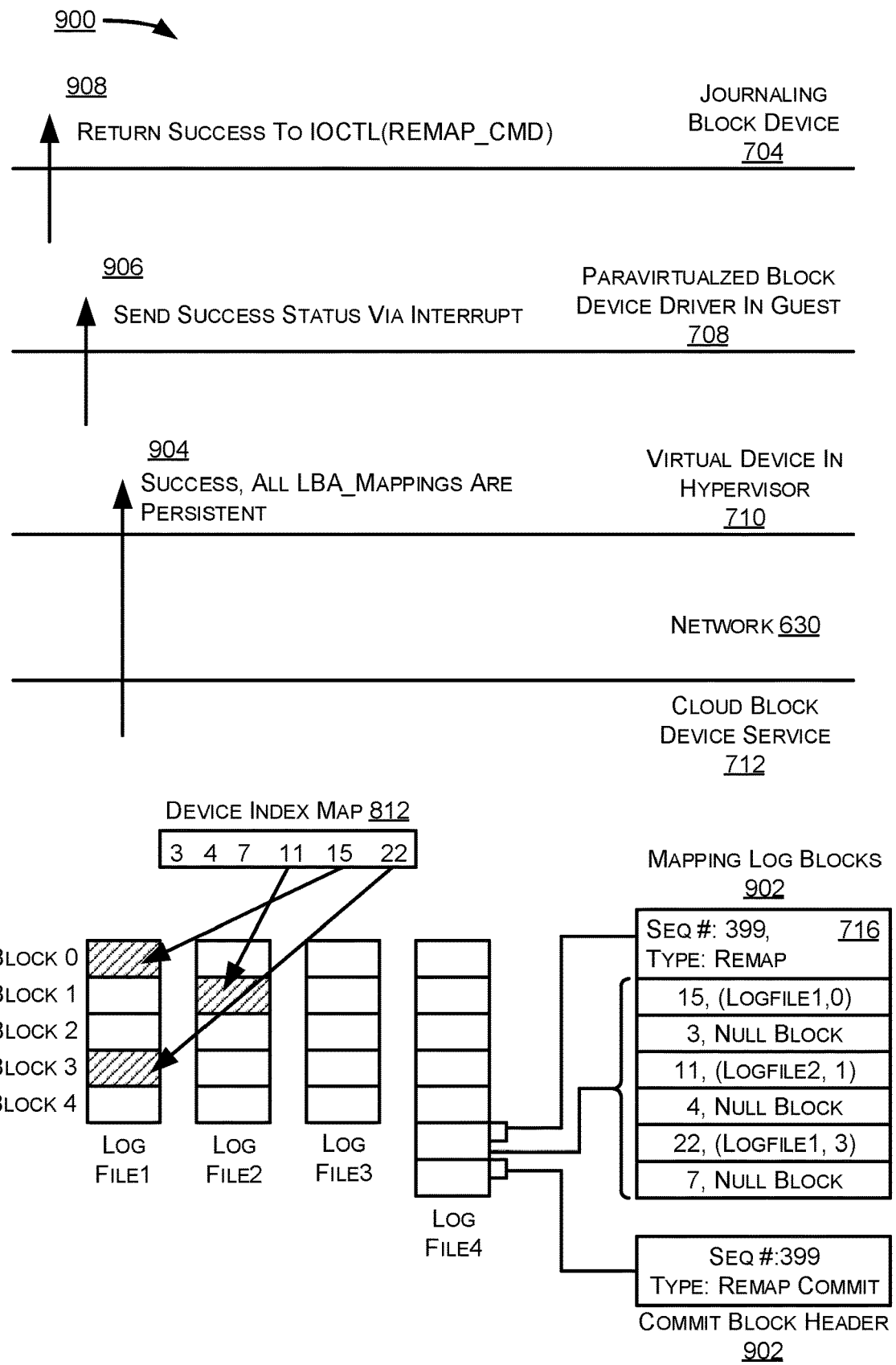
FIG. 9 illustrates a third example remap request initiation flow.

FIG. 9 illustrates a third example remap request initiation flow 900.

At this point, the new mappings 902 are persistent on a disk and the in-memory device index map 812 has the up-to-date LBA-to-physical location mappings. The cloud block device service 712 sends a RPC response 904 to the virtual device 710 in the hypervisor to indicate that the remapping request is completed, and the virtual device 710 interrupts the guest VM 906 to finish the original IOCTL request 908. Subsequently, the journaling block device thread is awakened from the blocking state and continues its work, knowing that all the specified remapping operations within one or more transactions have been completed.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. The system memory module 620 is an example of the computer-readable storage media. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-9. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A method in a cloud block service system having a virtual block device and a device index map of the virtual block device, the method comprising: receiving a remap request from a client, determining whether logical block address (LBA) mappings of the virtual block device in the remap request are valid in response to receiving the remap request, upon determining that the LBA mappings are valid, assigning a request sequence number to the remap request, and recording the LBA mappings, based on the device index map of the virtual block device, translating each LBA mapping to a corresponding pair of LBA-to-physical location mappings, writing the corresponding pairs of LBA-to-physical location mappings to a data logfile as corresponding remapping log blocks, appending a remapping commit block to the data logfile to indicate that the remap request is committed, and inserting the corresponding pairs of LBA-to-physical location mappings into the device index map.

B. The method as paragraph A recites, wherein determining whether the LBA mappings of the virtual block device in the remap request are valid in response to receiving the remap request includes determining whether a device identification (DeviceId) of the virtual block device and credentials of the client in the remap request are valid in response to receiving the remap request from the client, and upon determining that the DeviceId and the credentials are valid, determining whether the LBA mappings in the remap request are valid.

C. The method as paragraph A recites, wherein determining whether the LBA mappings of the virtual block device in the remap request are valid in response to receiving the remap request includes determining that the LBA mappings are not valid based on at least one of: at least one LBA in the LBA mappings being out of range of the virtual block device, or at least one LBA number existing in more than one LBA mappings.

D. The method as paragraph A recites, wherein each LBA mapping comprises a corresponding first LBA value and a corresponding second LBA value, and wherein a first LBA-to-physical location mapping of the corresponding pair of LBA-to-physical location mappings comprises the corresponding second LBA value and a corresponding first physical location determined in the device index map based on the corresponding first LBA value, and a second LBA-to-physical location mapping of the corresponding pair of LBA-to-physical location mappings comprises the corresponding first LBA value and a null location in the device index map where the null location is not in use.

E. The method as paragraph A recites, wherein metadata of each remapping log block includes a tag indicative of the corresponding block being a part of the remap request.

F. The method as paragraph A recites, further comprising replaying the data logfile corresponding to the virtual block device to reconstruct the device index map.

G. The method as paragraph F recites, wherein replaying the data logfile corresponding to the virtual block device to reconstruct the device index map includes, if a remapping commit block corresponding to the request sequence number is missing, omitting remapping log blocks of the request sequence number.

H. The method as paragraph A recites, further comprising periodically checkpointing the device index map into a separate index logfile, and upon determining that a latest request sequence number of a checkpointed device index map has surpassed a request sequence number of a corresponding remapping log block in the data logfile, deleting the corresponding remapping log block.

I. A system comprising: one or more processors, a virtual block device coupled to the one or more processors, memory coupled to the one or more processors, the memory storing computer executable instructions executable by the one or more processors, that when executed, causes the one or more processors to perform operations comprising: receiving a remap request from a client, determining whether a device identification (DeviceId) of the virtual block device and credentials of the client in the remap request are valid in response to receiving the remap request, upon determining that the DeviceId and the credentials are valid, determining whether logical block address (LBA) mappings of the virtual block device in the remap request are valid, upon determining that the LBA mappings are valid, assigning a request sequence number to the remap request, and recording the LBA mappings, based on a device index map of the virtual block device in the memory, translating each LBA mapping to a corresponding pair of LBA-to-physical location mappings, writing the corresponding pairs of LBA-to-physical location mappings to a data logfile as corresponding remapping log blocks, appending a remapping commit block to the data logfile to indicate that the remap request is committed, and inserting the corresponding pairs of LBA-to-physical location mappings into the device index map.

J. The system as paragraph I recites, wherein determining whether the LBA mappings of the virtual block device in the remap request are valid in response to receiving the remap request includes determining that the LBA mappings are not valid based on at least one of: at least one LBA in the LBA mappings being out of range of the virtual block device, or at least one LBA number existing in more than one LBA mappings.

K. The system as paragraph I recites, wherein each LBA mapping comprises a corresponding first LBA value and a corresponding second LBA value, and wherein a first LBA-to-physical location mapping of the corresponding pair of LBA-to-physical location mappings comprises the corresponding second LBA value and a corresponding first physical location determined in the device index map based on the corresponding first LBA value, and a second LBA-to-physical location mapping of the corresponding pair of LBA-to-physical location mappings comprises the corresponding first LBA value and a null location in the device index map where the null location is not in use.

L. The system as paragraph I recites, wherein metadata of each remapping log block includes a tag indicative of the corresponding block being a part of the remap request.

M. The system as paragraph I recites, wherein the operations further comprise: replaying the data logfile corresponding to the virtual block device to reconstruct the device index map, and if a remapping commit block corresponding to the request sequence number is missing, omitting remapping log blocks of the request sequence number.

N. The system as paragraph I recites, wherein the operations further comprise: periodically checkpointing the device index map into a separate index logfile, and upon determining that a latest request sequence number of a checkpointed device index map has surpassed a request sequence number of a corresponding remapping log block in the data logfile, deleting the corresponding remapping log block.

O. A computer readable medium storing computer-readable instructions executable by one or more processors, that when executed, causes the one or more processors to perform operations comprising: receiving a remap request from a client, determining whether a device identification (DeviceId) of a virtual block device and credentials of the client in the remap request are valid in response to receiving the remap request, upon determining that the DeviceId and the credentials are valid, determining whether logical block address (LBA) mappings of the virtual block device in the remap request are valid, upon determining that the LBA mappings are valid, assigning a request sequence number to the remap request, and recording the LBA mappings, based on a device index map of the virtual block device, translating each LBA mapping to a corresponding pair of LBA-to-physical location mappings, writing the corresponding pairs of LBA-to-physical location mappings to a data logfile as corresponding remapping log blocks, appending a remapping commit block to the data logfile to indicate that the remap request is committed, and inserting the corresponding pairs of LBA-to-physical location mappings into the device index map.

P. The computer readable medium as paragraph O recites, wherein determining whether the LBA mappings of the virtual block device in the remap request are valid in response to receiving the remap request includes determining that the LBA mappings are not valid based on at least one of: at least one LBA in the LBA mappings being out of range of the virtual block device, or at least one LBA number existing in more than one LBA mappings.

Q. The computer readable medium as paragraph O recites, wherein each LBA mapping comprises a corresponding first LBA value and a corresponding second LBA value, and wherein a first LBA-to-physical location mapping of the corresponding pair of LBA-to-physical location mappings comprises the corresponding second LBA value and a corresponding first physical location determined in the device index map based on the corresponding first LBA value, and a second LBA-to-physical location mapping of the corresponding pair of LBA-to-physical location mappings comprises the corresponding first LBA value and a null location in the device index map where the null location is not in use.

R. The computer readable medium as paragraph O recites, wherein metadata of each remapping log block includes a tag indicative of the corresponding block being a part of the remap request.

S. The computer readable medium as paragraph O recites, wherein the operations further comprise replaying the data logfile corresponding to the virtual block device to reconstruct the device index map, and if a remapping commit block corresponding to the request sequence number is missing, omitting remapping log blocks of the request sequence number.

T. The computer readable medium as paragraph O recites, wherein the operations further comprise periodically checkpointing the device index map into a separate index logfile, and upon determining that a latest request sequence number of a checkpointed device index map has surpassed a request sequence number of a corresponding remapping log block in the data logfile, deleting the corresponding remapping log block.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method in a cloud block service system having a virtual block device and a device index map of the virtual block device, the method comprising:
   receiving a remap request from a client;
   determining whether logical block address (LBA) mappings of the virtual block device in the remap request are valid in response to receiving the remap request, each LBA mapping comprising a corresponding first LBA value and a corresponding second LBA value;
   upon determining that the LBA mappings are valid, assigning a request sequence number to the remap request, and recording the LBA mappings;
   based on the device index map of the virtual block device, translating each LBA mapping to a corresponding pair of LBA-to-physical location mappings;
   writing the corresponding pairs of LBA-to-physical location mappings to a data logfile as corresponding remapping log blocks;
   appending a remapping commit block to the data logfile to indicate that the remap request is committed;
   inserting the corresponding pairs of LBA-to-physical location mappings into the device index map;
   periodically checkpointing the device index map into a separate index logfile; and
   upon determining that a latest request sequence number of a checkpointed device index map has surpassed a request sequence number of a corresponding remapping log block in the data logfile, deleting the corresponding remapping log block.

2. The method of claim 1, wherein determining whether the LBA mappings of the virtual block device in the remap request are valid in response to receiving the remap request includes:
  determining whether a device identification (DeviceId) of the virtual block device and credentials of the client in the remap request are valid in response to receiving the remap request from the client; and
  upon determining that the DeviceId and the credentials are valid, determining whether the LBA mappings in the remap request are valid.

3. The method of claim 1, wherein determining whether the LBA mappings of the virtual block device in the remap request are valid in response to receiving the remap request includes:
  determining that the LBA mappings are not valid based on at least one of:
  at least one LBA in the LBA mappings being out of range of the virtual block device; or
  at least one LBA number existing in more than one LBA mappings.

4. The method of claim 1,
  wherein a first LBA-to-physical location mapping of the corresponding pair of LBA-to-physical location mappings comprises the corresponding second LBA value and a corresponding first physical location determined in the device index map based on the corresponding first LBA value, and a second LBA-to-physical location mapping of the corresponding pair of LBA-to-physical location mappings comprises the corresponding first LBA value and a null location in the device index map where the null location is not in use.

5. The method of claim 1, wherein metadata of each remapping log block includes a tag indicative of the corresponding block being a part of the remap request.

6. The method of claim 1, further comprising:
  replaying the data logfile corresponding to the virtual block device to reconstruct the device index map.

7. The method of claim 6, wherein replaying the data logfile corresponding to the virtual block device to reconstruct the device index map includes:
  if a remapping commit block corresponding to the request sequence number is missing, omitting remapping log blocks of the request sequence number.

8. A system comprising:
  one or more processors;
  a virtual block device coupled to the one or more processors;
  memory coupled to the one or more processors, the memory storing computer executable instructions executable by the one or more processors, that when executed, causes the one or more processors to perform operations comprising:
    receiving a remap request from a client;
    determining whether a device identification (DeviceId) of the virtual block device and credentials of the client in the remap request are valid in response to receiving the remap request;
    upon determining that the DeviceId and the credentials are valid, determining whether logical block address (LBA) mappings of the virtual block device in the remap request are valid, each LBA mapping comprising a corresponding first LBA value and a corresponding second LBA value;
    upon determining that the LBA mappings are valid, assigning a request sequence number to the remap request, and recording the LBA mappings;
    based on a device index map of the virtual block device in the memory, translating each LBA mapping to a corresponding pair of LBA-to-physical location mappings;
    writing the corresponding pairs of LBA-to-physical location mappings to a data logfile as corresponding remapping log blocks;
    appending a remapping commit block to the data logfile to indicate that the remap request is committed;
    inserting the corresponding pairs of LBA-to-physical location mappings into the device index map;
    periodically checkpointing the device index map into a separate index logfile; and
    upon determining that a latest request sequence number of a checkpointed device index map has surpassed a request sequence number of a corresponding remapping log block in the data logfile, deleting the corresponding remapping log block.

9. The system of claim 8, wherein determining whether the LBA mappings of the virtual block device in the remap request are valid in response to receiving the remap request includes:
  determining that the LBA mappings are not valid based on at least one of:
  at least one LBA in the LBA mappings being out of range of the virtual block device; or
  at least one LBA number existing in more than one LBA mappings.

10. The system of claim 8,
  wherein a first LBA-to-physical location mapping of the corresponding pair of LBA-to-physical location mappings comprises the corresponding second LBA value and a corresponding first physical location determined in the device index map based on the corresponding first LBA value, and a second LBA-to-physical location mapping of the corresponding pair of LBA-to-physical location mappings comprises the corresponding first LBA value and a null location in the device index map where the null location is not in use.

11. The system of claim 8, wherein metadata of each remapping log block includes a tag indicative of the corresponding block being a part of the remap request.

12. The system of claim 8, wherein the operations further comprise:
  replaying the data logfile corresponding to the virtual block device to reconstruct the device index map; and
  if a remapping commit block corresponding to the request sequence number is missing, omitting remapping log blocks of the request sequence number.

13. A non-transitory computer readable medium storing computer-readable instructions executable by one or more processors, that when executed, causes the one or more processors to perform operations comprising:
  receiving a remap request from a client;
  determining whether a device identification (DeviceId) of a virtual block device and credentials of the client in the remap request are valid in response to receiving the remap request;
  upon determining that the DeviceId and the credentials are valid, determining whether logical block address (LBA) mappings of the virtual block device in the remap request are valid, each LBA mapping comprising a corresponding first LBA value and a corresponding second LBA value;
  upon determining that the LBA mappings are valid, assigning a request sequence number to the remap request, and recording the LBA mappings;

based on a device index map of the virtual block device, translating each LBA mapping to a corresponding pair of LBA-to-physical location mappings;

writing the corresponding pairs of LBA-to-physical location mappings to a data logfile as corresponding remapping log blocks;

appending a remapping commit block to the data logfile to indicate that the remap request is committed;

inserting the corresponding pairs of LBA-to-physical location mappings into the device index map;

periodically checkpointing the device index map into a separate index logfile; and upon determining that a latest request sequence number of a checkpointed device index map has surpassed a request sequence number of a corresponding remapping log block in the data logfile, deleting the corresponding remapping log block.

14. The non-transitory computer readable medium of claim 13, wherein determining whether the LBA mappings of the virtual block device in the remap request are valid in response to receiving the remap request includes:

determining that the LBA mappings are not valid based on at least one of:

at least one LBA in the LBA mappings being out of range of the virtual block device; or at least one LBA number existing in more than one LBA mappings.

15. The non-transitory computer readable medium of claim 13, wherein a first LBA-to-physical location mapping of the corresponding pair of LBA-to-physical location mappings comprises the corresponding second LBA value and a corresponding first physical location determined in the device index map based on the corresponding first LBA value, and a second LBA-to-physical location mapping of the corresponding pair of LBA-to-physical location mappings comprises the corresponding first LBA value and a null location in the device index map where the null location is not in use.

16. The non-transitory computer readable medium of claim 13, wherein metadata of each remapping log block includes a tag indicative of the corresponding block being a part of the remap request.

17. The non-transitory computer readable medium of claim 13, wherein the operations further comprise:

replaying the data logfile corresponding to the virtual block device to reconstruct the device index map; and if a remapping commit block corresponding to the request sequence number is missing, omitting remapping log blocks of the request sequence number.

* * * * *